July 19, 1949. T. B. DILWORTH 2,476,406
TEMPERATURE CONTROL FOR ENGINE COOLING SYSTEMS
Filed Jan. 29, 1947
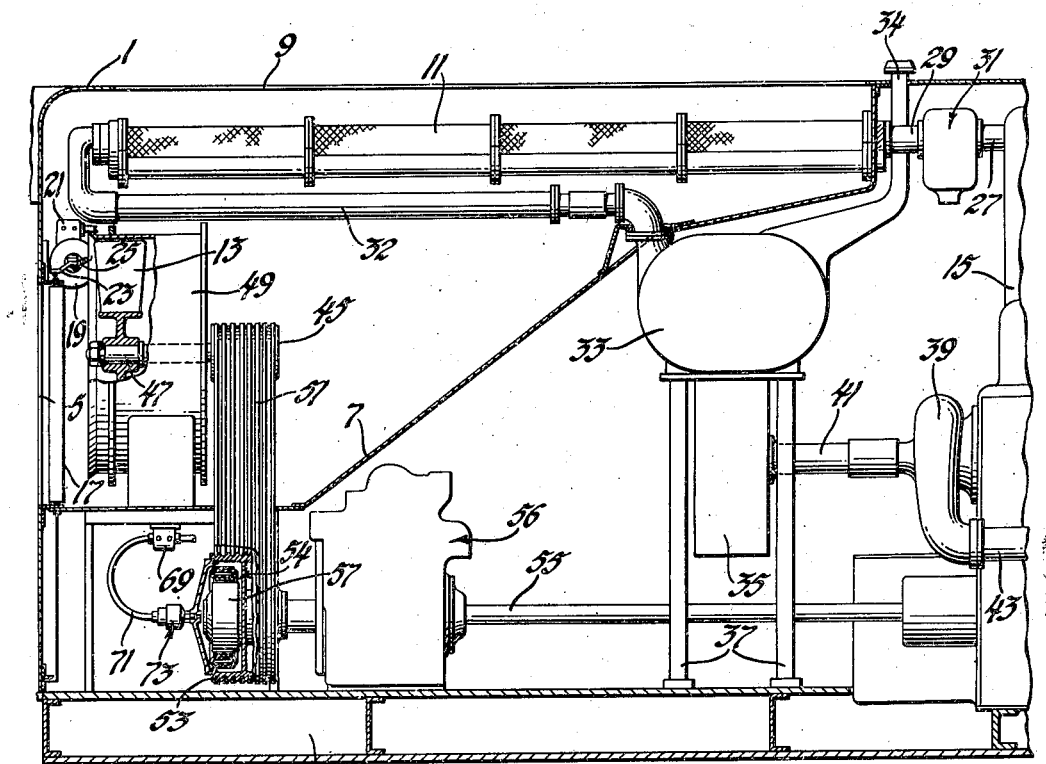
Fig. 1
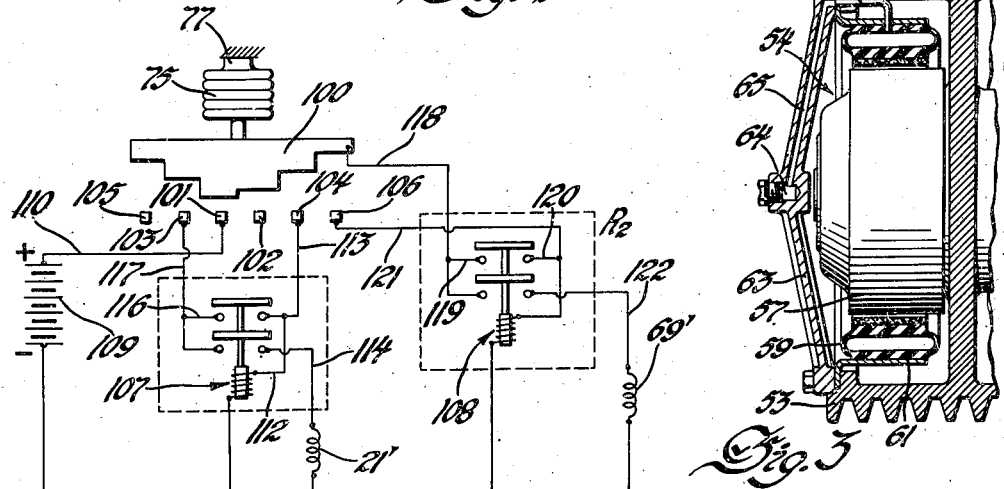
Fig. 2
Fig. 3
Inventor
Thomas B. Dilworth
by
Spencer, Willits, Helmig & Baillio
Attorneys Patented July 19, 1949

2,476,406

UNITED STATES PATENT OFFICE 2,476,406

TEMPERATURE CONTROL FOR ENGINE COOLING SYSTEMS

Thomas B. Dilworth, Clarendon Hills, Ill., assignor to General Motors Corporation, Detroit, Mich., a corporation of Delaware Application January 29, 1947, Serial No. 725,072

4 Claims. (Cl. 123—178)

The present invention relates to engine cooling systems of the temperature responsive type.

The principal object of the present invention is to provide a simple cooling system for an engine including an engine radiator, a radiator shutter and cooling fan and means responsive to the temperature of the engine for controlling overlapping reversed sequential operation of the radiator shutter and fan to maintain more uniform engine temperature for wide variations in ambient temperature, and engine speed, load and output.

The combined engine cooling system by which the above and other objects are accomplished will become apparent by reference to the following detailed description and drawing illustrating one modification of my cooling system which is particularly adapted for locomotives.

Figure 1 is a cross sectional elevation of the portion of a locomotive including the engine and cooling system therefor.

Figure 2 is a wiring diagram showing the temperature responsive control apparatus in schematic form.

Figure 3 is an enlarged cross sectional view of a detail shown in Figure 1.

As best illustrated in Figure 1 a hood 1 mounted on the underframe 3 of a locomotive is provided with a cooling air inlet 5 opening in one end and a baffle 7 is shown extending inwardly and diagonally upwardly from the lower edge of the air inlet opening to the rear of an air outlet opening 9 in the top of the hood to provide an upper compartment in which an engine coolant radiator 11 and cooling fan 13 are mounted and a lower compartment for the locomotive engine 15 of the internal combustion type and fan driving means mounted on the underframe 3. Shutter blades 17 pivoted about vertical axes in the hood 1 are provided in the air inlet opening 5 thereof. An air pressure cylinder 19 having a well known type of electromagnetically operated pressure application and relief shutter control valve 21 connected thereto in a well known manner for controlling pressure application to and relief of pressure from the cylinder 19 in order to cause the opening of the shutter blades 17 upon energization of the valve winding 21' shown in Figure 2. The piston and rod of the cylinder 19 are shown connected to operating arms 23 of the shutter blades 17 to move the blades to the open position. The blades 17 are normally urged to the closed position by a spring 25 connected to the operating arms 23 upon relief of pressure from the cylinder 19 by deenergization of the valve winding 21'.

The engine water outlet manifold 27 is connected by pipe connection 29, including an automatic temperature responsive control mechanism, shown generally at 31, to the inlet of the radiator 11. The outlet of the radiator 11 is shown connected by a pipe 32 and connections to a storage tank 33 having a fill pipe 34 and an engine oil cooler 35 attached thereto and supported on the underframe 3 in the engine compartment by by means of legs 37. The engine 15 is provided with a coolant pump 39 driven thereby. The inlet of the pump is connected by pipe connections 41 to the engine oil cooler 35 and draws coolant therefrom and discharges the coolant under pressure to the engine inlet coolant manifold 43 to cause circulation of coolant through the engine and radiator.

The fan 13 and a grooved fan pulley 45 is secured on a shaft 47 rotatable in a fan shroud 49 which is supported in the upper compartment of the hood 1. The fan pulley 45 is connected by means of V belts 51 to a grooved driven pulley member 53 of an air pressure engaged clutch member, indicated generally at 54 in Figures 1 and 3, on the end of an engine driven shaft 55 for driving the fan 13. An air compressor, indicated generally at 56 in Figure 1, is shown mounted on the underframe 3 and is driven directly by the shaft 55.

The air pressure engaged clutch mechanism 54 comprises the previously mentioned driven pulley member 53 which is rotatably mounted on the end of the shaft 55, a driving drum 57 within the pulley and secured to the shaft 55 and an annular flexible pneumatic tire or gland 59 positioned between the driving drum 57 and driven pulley 53 and secured to a flange 61 attached to the driven pulley member. A circular cover 63 is also secured to the outer face of the driven pulley 53 and is provided with a central air pressure opening 64 communicating with a radial passage 65 therein and is connected to the interior of the gland or tire 59 by a tube 67. As best shown in Figure 1 an electromagnetic clutch control valve 69 is connected by means of a flexible tube 71 to the stationary element of a conventional rotary air pressure seal, indicated generally at 73, the rotary member of which is connected to the central air opening 64 of the clutch cover 63. With this arrangement when the electromagnetic clutch control valve 69 is energized air pressure is applied through the rotary seal 73 to the interior clutch gland or tire 59 secured to the clutch driven pulley 53 to cause distension and frictional engagement of the tire with the clutch driving drum 57 for rotation therewith. The belts 51 from the clutch driven pulley 53 to the fan pulley 45 accordingly cause rotation of the radiator cooling fan 13 and circulation of air from the cooling air inlet opening 5 in the end of the hood 1, through the radiator 11 and out through the upper air outlet opening 9 of the hood.

Suitable air pressure connections are provided from the locomotive air reservoir, not shown, supplied with air pressure from the compressor 56 to the shutter and clutch control electromagnetic valves 21 and 69. The electrical control connections between the shutter and clutch control valves and the automatic temperature responsive mechanism shown generally at 31 in the engine coolant outlet manifold connection 27 are shown schematically in detail in Figure 2 and will now be described. The automatic temperature responsive mechanism 31 comprises a thermal element 75 having one end 77 anchored and a stepped contact bar 100 secured to and movable successively into contact with adjacent stationary contacts 101, 102, 103, 104, 105 and 106, certain ones of which are electrically connected by means of relays shown generally at 107—108 with the windings 21' and 69' of the shutter and clutch control valves 21 and 69, respectively, to control energization and deenergization and opening of these valves in proper sequence for an increase and a decrease in engine temperature. The valves 21 and 69 are of conventional form, each having an exhaust port open to atmosphere when the windings are deenergized to vent the shutter cylinder 19 and clutch tire to atmosphere to cause closure of the shutters 17 and disengagement of the fan clutch 54.

The positive terminal of the locomotive battery 109 is connected to the contact 101 by a positive conductor 110 and the negative terminal is connected by a negative return conductor 111 and branch conductors leading therefrom to one side of the windings of each of relays 107—108 and to one side of each of the control valve windings 21'—69'. The other side of the winding of the relay 107 is connected by conductors 112 and 113 to the upper right-hand stationary contact of the relay 107 and also to the contact 104. The lower right-hand stationary contact of the relay 107 is connected by a conductor 114 to the other side of the shutter valve winding 21'. The left-hand upper and lower stationary contacts of the relay 107 are connected by conductors 116—117 to the contact 103. The stepped contactor bar 100 is connected by a flexible conductor 118 and a conductor 119 to the left-hand upper and lower stationary contacts of the relay 108. The upper right-hand stationary contact of the relay 108 is connected to the contact 106 and to the other side of the winding of the relay 108 by conductors 120—121. The lower right-hand stationary contact of the relay 108 is connected by a conductor 122 to the other side of the winding 69' of the clutch control valve. As shown, each of the relays 107—108 has an armature provided with upper and lower contacts normally positioned out of contact with the upper and lower stationary relay contacts when the winding is deenergized. Energization of either relay winding causes the armature to move from the normal out of contact position as shown into contact with both the upper and lower pairs of stationary relay contacts.

With the temperature of the coolant in the engine outlet manifold 27 below the normal range of operating temperature the thermally expansible element 75 and stepped contact 100 operated thereby are in the position shown. Upon an increase in the temperature of the engine coolant to the minimum value in the range for efficient engine operation, the stepped contact bar 100 is moved by expansion of the thermal element into contact with the stationary contact 101 so that the contacts 100—101 are connected to the positive battery conductor. A higher temperature in the operating range causes the thermal element to move the stepped contact bar successively into contact with the stationary contact 102, 103 and 104. Contact 102 is not used but upon bridging of the contacts 103—104 by the contact bar 100 a circuit is established through the contacts 100—103—104 to the winding of the relay 107 through conductors 110, 113, 112 and 111 to cause bridging of the stationary relay contacts by the armature contacts. Bridging of the lower pair of contacts completes an energizing circuit through the winding 21' of the shutter control valve through conductor 110, contacts 100—103 and conductors 117, 114 and 111 to cause opening of this valve to allow air pressure to enter the shutter cylinder 19 causing movement of the piston and rod therein to open the shutters 17 against the action of the spring 25 so that outside air may enter the air inlet opening 5 of the hood 1. Bridging of the upper pair of contacts of the relay 107 establishes a holding energizing circuit to the winding of the shutter valve winding 21' through contacts 100—103 and conductors 110, 117, 116, 113, 112 and 111. If the load and temperature of the engine increases further to the upper portion of the operating range the thermal element 75 expands further and successively moves the stepped contact 100 into contact with the stationary contacts 105 and 106. Contact 105 is not used but upon contact between the contacts 100 and 106 an energizing circuit is established therethrough and through the conductors 110 and 121 the winding of the relay 108 and conductor 111 to cause bridging of the stationary contacts of the relay 108 by the armature contacts. Bridging of the lower contacts of the relay 108 establishes an energizing circuit through the conductors 110, 118 and 122, the winding 69' of the clutch control valve 69 and return conductor 111 to cause opening of the clutch control valve 69 and application of air pressure to the clutch tire 59 through the rotary seal 73 to cause engagement thereof and operation of the radiator fan 13. Bridging of the upper contacts of the relay 108 establishes a holding energizing circuit through conductors 110, 118, 119, 120, 121 and 111 to the winding of the relay 108. The fan is capable of providing sufficient circulation of cooling air through the radiator 11 for maximum values of ambient temperature, engine speed and load conditions and direction of locomotive operation and wind.

Upon a reduction in engine coolant temperature to below the operating range the thermal element 75 contracts and moves the stepped contact 100 out of contact with the stationary contacts 106, 104, 103, 102 and 101 successively. When the stepped contact 100 is moved out of contact with the contact 103 the holding energizing circuit comprising conductors 110, 117, 116, 113, 112 and 111 to the winding of the relay 107 is broken causing opening of the relay contacts and deenergization of the winding 21' of the shutter control valve 21 to cause venting of the shutter air cylinder 19 and closure of the shutters 17 by the spring 25. When the engine temperature drops below the minimum value of the operating range and contact 100 is moved out of contact with stationary contact 101 and the holding energizing circuit of the relay winding 108 comprising conductors 110, 118, 119, 120 and 111 is broken causing opening of the relay contacts and deenergization of the winding 69' of the clutch control valve 69 to cause venting of the clutch tire 59 and disengagement of the fan clutch 54 and shut down of the fan 13.

It will be evident from the above description that upon increase in the temperature of the engine coolant to the upper portion of the operating range the shutters 17 in the cooling air inlet opening 5 are opened followed by operation of the radiator cooling fan 13 and upon a decrease in temperature to the lower portion of the operating range the shutters are closed followed by shut down of the fan. This overlapping reversed operating sequence prevents under and over cooling of the engine and thereby provides efficient engine operation for wide variations of ambient temperature, direction and speed of winds and locomotive operation, and speed and output of the engine encountered in locomotive service.

I claim:

1. In a cooling system, an engine, a coolant radiator therefor, a radiator cooling fan, a clutch between said engine and said fan, shutters for controlling circulation of air through said radiator, an engine coolant temperature responsive device, control means for said clutch and said shutters connected to said device for sequential operation thereby whereby said shutters are opened prior to engagement of said clutch of said fan upon warm-up of said engine and said shutters are closed prior to disengagement of said clutch upon a decrease in said engine temperature.

2. In a cooling system, an engine, a coolant radiator therefor, a radiator cooling fan, a clutch between said engine and said fan, shutters for controlling flow of air through said radiator by convection and by action of said fan and combined shutter and clutch control means including engine coolant responsive means and relays having holding in means for causing overlapping reversed sequential operation of said shutters and said fan whereby said shutters are opened prior to operation of said fan by said engine at successively higher values of engine coolant temperature and said fan is shut down after closure of said shutters at successive lower values of engine coolant temperature.

3. In a cooling system, an engine, a coolant radiator therefor, an engine driven coolant pump for circulating coolant through said engine and said radiator, means for controlling the flow of cooling air through said radiator, said means including a radiator cooling fan and shutters for permitting or preventing flow of air through said radiator, fan driving means including a clutch between said engine and said fan and combined shutter and clutch control means comprising relay means including holding means and engine coolant responsive control means whereby upon successively higher values of coolant temperature the shutters are opened prior to operation of the fan and at successively lower values of temperature the shutters are closed prior to shut down of the fan.

4. In a cooling system for an engine having a coolant circulating pump, a coolant radiator and a radiator cooling fan, a pneumatic clutch between said engine and said fan, pneumatically operated shutters for permitting or preventing air flow through said radiator and combined control mechanism for causing overlapping reversed sequential operation of said shutters and said clutch, said mechanism including electropneumatic shutter and clutch control means, control relays including energizing holding means and engine coolant temperature responsive switching means for controlling said relays whereby said shutters are opened at one temperature and closed at a lower temperature and said fan clutch is engaged at a higher temperature than that causing the opening of said shutters and disengaged at a lower temperature than that causing the closure of said shutters.

THOMAS B. DILWORTH.

REFERENCES CITED

The following references are of record in the file of this patent:

UNITED STATES PATENTS

| Number | Name | Date |
| --- | --- | --- |
| 1,481,306 | Stuart | Jan 22, 1924 |
| 1,481,307 | Stuart | Jan. 22, 1924 |
| 1,837,564 | McCaleb | Dec. 22, 1931 |
| 2,336,840 | Brehob | Dec. 14, 1943 |